(12) United States Patent
Fromherz

(10) Patent No.: US 8,315,898 B2
(45) Date of Patent: Nov. 20, 2012

(54) PLANNING AND SCHEDULING RECONFIGURABLE SYSTEMS AROUND OFF-LINE RESOURCES

(75) Inventor: Markus P. J. Fromherz, Palo Alto, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 2224 days.

(21) Appl. No.: 10/284,514

(22) Filed: Oct. 30, 2002

(65) Prior Publication Data

US 2004/0088207 A1 May 6, 2004

(51) Int. Cl.
G06Q 10/00 (2012.01)
(52) U.S. Cl. .................................... 705/7.12; 705/7.11
(58) Field of Classification Search .............. 705/7.12, 705/7.11
See application file for complete search history.

(56) References Cited

U.S. PATENT DOCUMENTS

| | | | |
|---|---|---|---|
| 4,888,692 A * | 12/1989 | Gupta et al. | 700/96 |
| 5,093,794 A * | 3/1992 | Howie et al. | 700/100 |
| 5,095,342 A | 3/1992 | Farrell et al. | 355/319 |
| 5,159,395 A | 10/1992 | Farrell et al. | 355/319 |
| 5,363,175 A * | 11/1994 | Matysek | 399/77 |
| 5,444,632 A * | 8/1995 | Kline et al. | 700/100 |
| 5,467,449 A * | 11/1995 | Gauronski et al. | 714/57 |
| 5,557,367 A | 9/1996 | Yang et al. | 355/202 |
| 5,631,740 A | 5/1997 | Webster et al. | 358/296 |
| 5,646,740 A * | 7/1997 | Webster et al. | 358/296 |
| 5,696,893 A | 12/1997 | Fromherz et al. | 395/112 |
| 5,826,040 A * | 10/1998 | Fargher et al. | 705/8 |
| 5,988,857 A * | 11/1999 | Ozawa et al. | 700/213 |
| 6,141,598 A * | 10/2000 | Nam | 700/95 |
| 6,279,009 B1 * | 8/2001 | Smirnov et al. | 707/103 R |
| 6,347,256 B1 * | 2/2002 | Smirnov et al. | 700/100 |
| 6,349,237 B1 * | 2/2002 | Koren et al. | 700/96 |
| 6,438,436 B1 * | 8/2002 | Hohkibara et al. | 700/97 |
| 6,516,239 B1 * | 2/2003 | Madden et al. | 700/115 |
| 6,546,364 B1 * | 4/2003 | Smirnov et al. | 703/22 |
| 6,583,386 B1 * | 6/2003 | Ivkovich | 219/130.01 |
| 6,591,153 B2 * | 7/2003 | Crampton et al. | 700/103 |
| 6,606,527 B2 * | 8/2003 | de Andrade et al. | 700/97 |
| 6,874,034 B1 * | 3/2005 | Hertling | 709/245 |
| 6,889,101 B1 * | 5/2005 | Gudmundsson et al. | 700/97 |
| 6,983,188 B2 * | 1/2006 | Loughran et al. | 700/99 |
| 7,539,630 B2 * | 5/2009 | Crampton et al. | 705/26.1 |
| 2002/0069096 A1 * | 6/2002 | Lindoerfer et al. | 705/7 |

(Continued)

FOREIGN PATENT DOCUMENTS

WO  WO 00/38091 A1  6/2000

(Continued)

OTHER PUBLICATIONS

Chung-Yee Lee, "Machine Scheduling with an Availability Constraint," 9 J. Global Optimization at 395 (1996).*

(Continued)

Primary Examiner — Thomas Mansfield
(74) Attorney, Agent, or Firm — Oliff & Berridge, PLC

(57) ABSTRACT

A system is provided to allow for planning and scheduling the work flow for reconfigurable production systems having a plurality of modules, which may have alternative capabilities. The system includes a system controller, at least one planning function for planning the production of work units without utilizing off-line modules, and at least one scheduling function for scheduling the production of work units without utilizing off-line modules.

31 Claims, 4 Drawing Sheets

U.S. PATENT DOCUMENTS

2002/0089688 A1* 7/2002 Ferlitsch et al. ............. 358/1.15
2002/0114004 A1* 8/2002 Ferlitsch .................... 358/1.15

FOREIGN PATENT DOCUMENTS

WO    WO 01/06426 A1    1/2001

OTHER PUBLICATIONS

M. Selim Akturk & Elif Gorgulu, "Match-up scheduling under a machine breakdown," 112 Euro. J. Operational Res. 81 (1999).*

Susanne Albers & Gunter Schmidt, "Scheduling with unexpected machine breakdowns," 110 Discrete Applied Mathematics 85 (2001).*

"The control of hazardous energy (lockout/tagout)," 29 C.F.R. § 1910.147 (1996).*

Fromherz et al., "Model-based computing: Developing flexible machine control software", Artificial Intelligence, 114, (1999), pp. 157-202.*

Canadian Office Action received in CA Application No. 2,446,664 dated Feb. 24, 2012.

* cited by examiner

PLANNING AND SCHEDULING RECONFIGURABLE SYSTEMS AROUND OFF-LINE RESOURCES

CROSS REFERENCE TO RELATED APPLICATIONS

The following copending applications, U.S. application Ser. No. 10/284,561, titled "Planning and Scheduling Reconfigurable Systems with Many Alternative Capabilities", and U.S. application Ser. No. 10/284,560, titled "Planning and Scheduling Reconfigurable Systems with Regular and Diagnostic Jobs", all filed of even date, are assigned to the same assignee of the present application. The entire disclosures of these copending applications are totally incorporated herein by reference in their entirety.

INCORPORATION BY REFERENCE

The following U.S. patents are fully incorporated herein by reference: U.S. Pat. No. 5,631,740 to Webster et al. ("Transducers with Constraints Model for Print Scheduling"); and U.S. Pat. No. 5,696,893 to Fromherz et al. ("System for Generically Describing and Scheduling Operation of Modular Printing Machine").

BACKGROUND OF THE INVENTION

This invention relates generally to a system and method for planning and scheduling work flow and processes for reconfigurable production operations and equipment, which requires continued system operation around off-line resources.

Reconfigurable production systems increasingly consist of multiple parallel, alternative modules that are connected through flexible paths and even loops. Consequently, such systems are expected to offer a multitude of alternative operations (or capabilities) to produce the same outputs. For example, a modular printing system may consist of several identical, parallel printers connected through flexible paper paths that feed to and collect from these printers. For previous, in-line systems with few alternative capabilities, the entire system was usually stopped when one of its modules went off-line, perhaps when a fault occurred, except for specific modules, such as feeder modules in printing systems. With the types of parallel systems described above, it is desirable to continue using all available system capabilities by planning and scheduling around the off-line module as necessary.

A reconfigurable production system may be modeled as a graph of connected modules, with each module described by a model of its structure and its capabilities. The structure is primarily the interface through with work units enter and exit, such as entry and exit ports, plus any internally used resources. A capability is an operation that accepts work units at entry ports, processes them, and moves them to exit ports. (Entry and exit ports here refer to mechanical interfaces, such as slots or trays, as well as computer interfaces. A port may serve as both entry and exit port.) Operation of such a system has been modeled as a sequence of capability executions as work units move along valid paths in the graph from module to module.

An example for a reconfigurable production system is a modular printer, with modules such as feeders, mark engines, paper transports, inverters, etc. There, the work units are sheets and images. A simple paper transport module has an entry port, an exit port, and a single capability, to move a sheet of paper from its entry port to its exit port. An inverter module has one entry port, one exit port, and two capabilities, one to invert a sheet of paper and one to bypass the inversion mechanism. A mark engine transfer module has two entry ports (one for sheets and one for images), one exit port (for marked sheets), and one capability, to print the image onto the sheet. A sample resource in all of these modules is the space occupied by the sheet, which may only be occupied by one sheet at a time. Other examples of reconfigurable production systems are assembly lines, for example for the assembly or packing of computer parts, and automated analytic systems, such as blood sample analysis machines. In these various production systems, work units may be sheets of paper, electronic files, computer parts, semiconductor wafers, blood sample trays, any parts or composites of these, or other physical or electronic objects being processed by production systems. Transport mechanisms may be conveyor belts or robotic arms or any other devices or functions for moving work units.

Module capabilities may be composed to system capabilities by incrementally unifying work unit and time variables of output and input events at connected modules along valid paths in the system graph. For example, if a module's exit port is connected to another module's entry port, any capability producing work units for the first module's exit port potentially can be composed with any capability consuming work units from the second module's entry port. Unification of work unit and time variables ensures the consistency of attribute and time constraints.

A scheduler for such systems receives a stream of jobs, each consisting of a sequence of desired work units to be produced at some final exit port of the system. Each desired work unit is described by a work unit variable with attribute constraints. This is used to select a suitable system capability that can produce the desired work unit by unifying the desired work unit variable with the work unit variables of system capabilities producing work units for the desired exit port. As system capabilities for the desired work units in the jobs are found, their time and resource constraints are posted to the constraint store, and the constraints are solved in order to find time values for the various module capabilities producing the desired work units. The selected module capabilities plus the time values are then sent to the modules so that they can execute the corresponding operations at the designated times.

This approach as implemented for traditional, in-line systems with few alternative capabilities assumes that typically the entire system is stopped when one of its modules goes off-line because of a fault. With the above approach, a special check is added before capability selection to use only entry and exit ports, feed trays and finishers that are available.

This approach proves unsatisfactory for systems with many alternative, parallel system capabilities. With these systems, it is desirable to continue using all available system capabilities by planning and scheduling around an off-line module as necessary. Furthermore, this should be enabled for all modules and even partial modules, for example, only one of several alternative paths in a module, not just for modules at the periphery of the system.

SUMMARY OF THE INVENTION

Briefly stated, and in accordance with one aspect of the present invention, there is provided a system which allows for planning and scheduling the work flow for reconfigurable production systems having a plurality of modules, each of which may have alternative capabilities. The system includes a system controller, at least one planning function for planning the production of work units without utilizing off-line modules, and at least one scheduling function for scheduling the production of work units without utilizing off-line modules.

In accordance with another aspect of the present invention, there is provided a method for planning and scheduling the work flow for reconfigurable production systems having a plurality of modules. Each of the modules may have various capabilities. The method includes planning the production of work units without utilizing off-line modules and also scheduling the production of work units without utilizing off-line modules.

In accordance with yet another aspect of the present invention, there is provided an article of manufacture taking the form of a computer usable medium in which computer readable program code is embodied. When the program code is executed by the computer, the computer performs method steps for planning and scheduling computer controlled reconfigurable production systems. The method includes planning the work flow of a reconfigurable production system without utilizing off-line modules and also scheduling the work flow for the modules in the reconfigurable production system.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Disclosed herein is a method and system for planning and scheduling functions within a system controller, in which the controller provides for continued use of all available system capabilities by planning and scheduling around an off-line module as necessary. Furthermore, the method and system enables this functionality for all modules, even partial modules, rather than only for modules at the periphery of the system. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
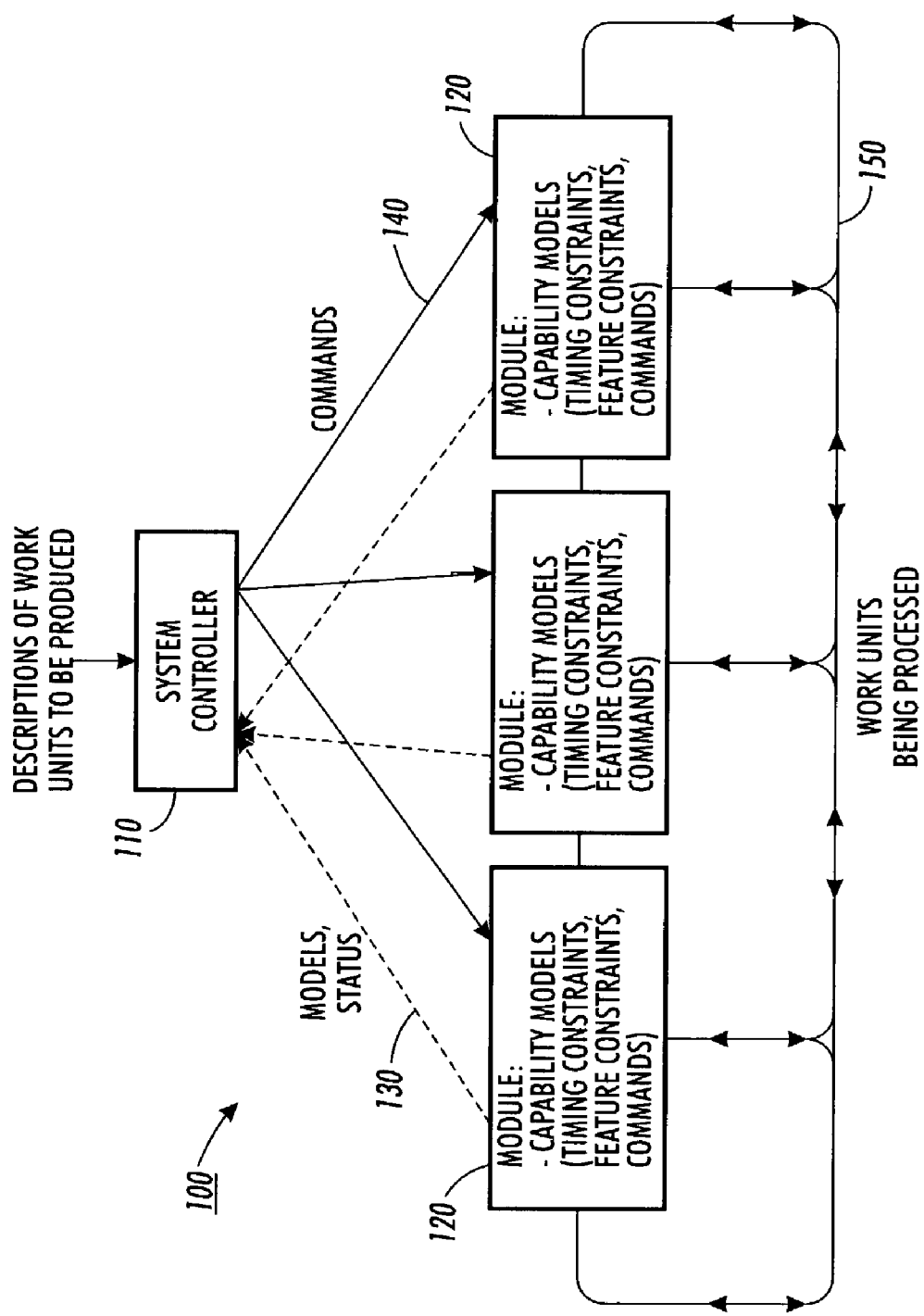
FIG. 1 illustrates a controller in accordance with one embodiment of the subject invention.

Turning now to the drawings, wherein the purpose is for illustrating the embodiments of the system and method, and not for limiting the same, FIG. 1 illustrates a controller for integrating planning and scheduling functions in conformance with one embodiment of the subject system. In a system 100, system controller 110 receives descriptions of work units to be produced from any known type of job input source. These descriptions correspond to descriptions of the desired output products. They may specify attributes (or properties) of the products, values or ranges or general constraints for these attributes, and possibly constraints on the timing of the production (e.g., deadlines), but generally without specifying how the products are to be produced.

System controller 110 also receives, along paths 130, capability models from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, the time during which a resource is occupied, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. Additionally there is also capability for operator feedback as to the work being scheduled on the modules and the state of the system at any point in time.

Figure 2:
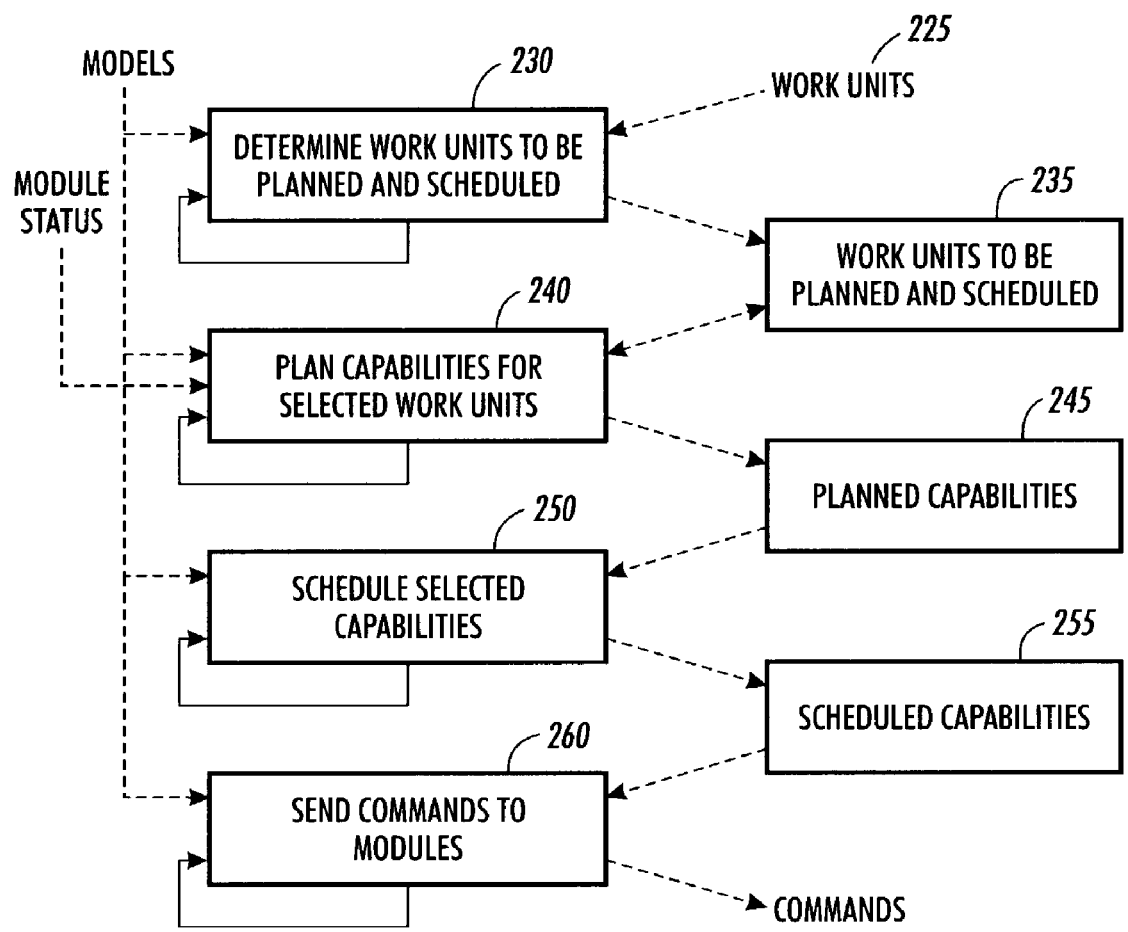
FIG. 2 provides a flow chart detailing the ordering of operations to accomplish system planning and scheduling in accordance with one embodiment of the subject invention.

FIG. 2 illustrates the planning and scheduling method of operation for the system controller. In this diagram, method steps are described in terms of data received and provided to each subsequent step in the process. Each of the steps 230, 240, 250, and 260 in this process may be executed in sequence (one after the other) or concurrently. In either case, each step consumes data 225, 235, 245, or 255 provided by a previous step and produces data 235, 245, 255, or 265 for the subsequent step. Consuming and producing this data is generally done incrementally, where a step is processing one data item after another, but may also be done in batches, as will be obvious to one skilled in the art of real-time software. Initially, a description of the work units 225, or job to be performed, is provided to the controller. The controller also has the models of the system modules available together with the current state of the system, e.g., which operations are currently performed by the modules, and any capabilities it may have previously planned and scheduled. The controller determines the work units to be planned and scheduled at step 230, based on the capability models provided by each module to be controlled and directed. This is an iterative step in which the controller incrementally reviews the jobs and their work units to select those work units to be planned and scheduled for the job next The selected work units 235 are then transmitted to step 240, which plans the capabilities for the selected work units, taking into consideration the capability model for each module. This step is repeated for each work unit selected in the previous step, resulting in a set of planned capabilities 245. With planned capabilities 245 and the module capability models, the controller at step 250 schedules the selected capabilities and provides a set of scheduled capabilities 255. These are in turn provided to step 260, at which the controller sends the commands 265 corresponding to the scheduled capabilities to the individual modules. This step is repeated for each scheduled capability. As can be seen in FIG. 2, each of steps 230, 240, 250 and 260 has all model information available for selective usage during each step. For example step 240 may access feature constraints, step 250 may utilize timing constraints, and step 260 may utilize commands.

Figure 3:
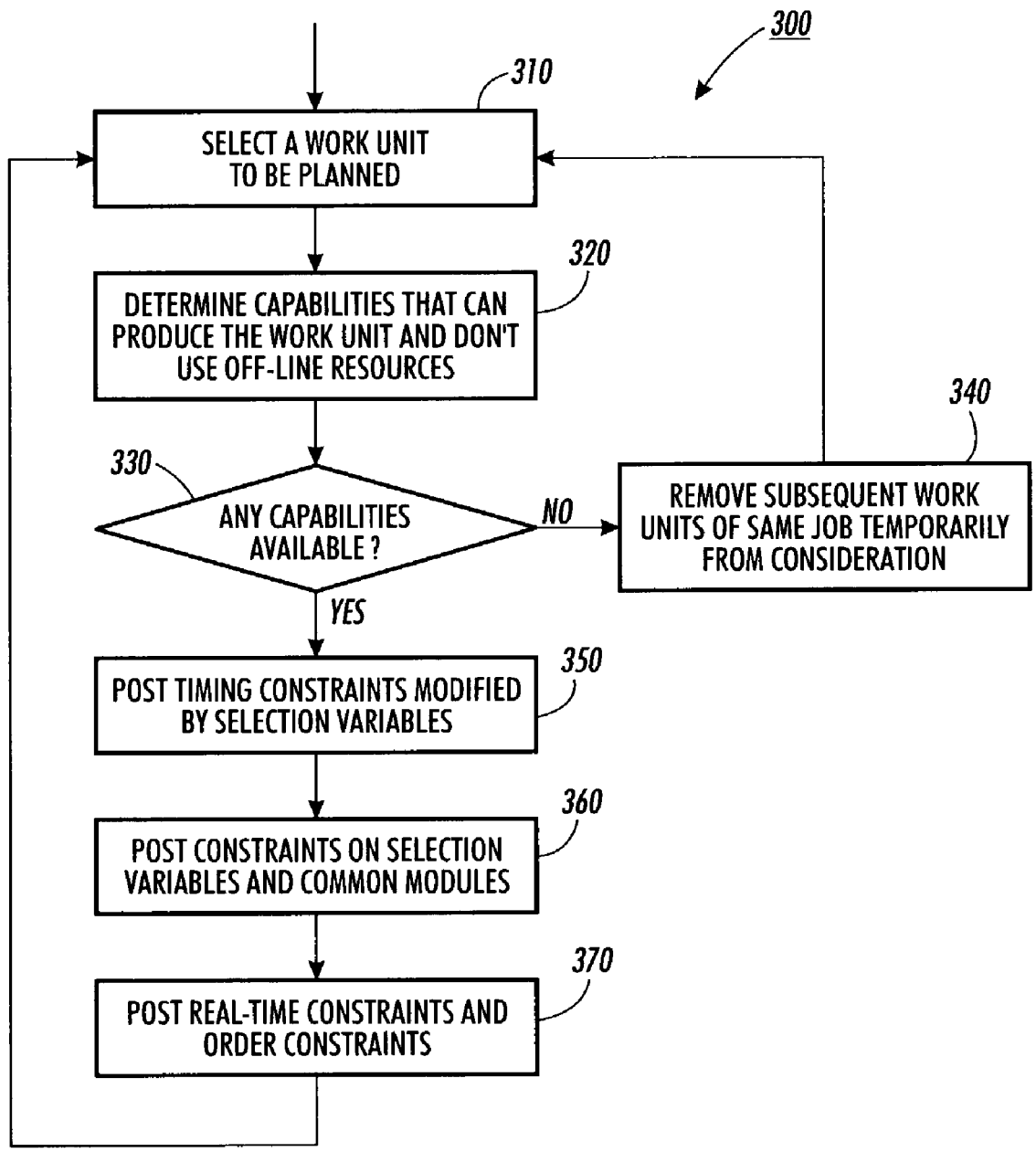
FIG. 3 provides a flow chart detailing the operation of the system planning component in accordance with one embodiment of the subject invention.

In FIG. 3, a flow chart illustrates the planning function 300 of the controller. A work unit or job to be planned is selected at step 310 based on the input job description. The controller then determines the capabilities needed to produce the work unit without utilizing off-line resources at step 320. An off-line resource is any module or partial module that is currently unavailable, e.g., because it is powered down or broken. In making this determination at step 320, the controller considers all possible system capabilities, excluding the capabilities of the off-line resource(s), from which alternative capabilities are selected. The controller determines if capabilities are available to produce the work unit at step 330. If sufficient capabilities are not available, subsequent work units of the same job are temporarily removed from consideration at step 340 and the controller returns to step 310 to select another work unit to be planned. The capabilities of the off-line resource cannot be selected. If no capability remains available for a desired work unit, all subsequent work units of the same job will be delayed, even if they could be produced, in order to avoid out-of-order output delivery.

Work units which have been temporarily removed from consideration for planning and scheduling because of off-line resources are automatically re-considered in step 310 on subsequent iterations and will be delayed again if the required resources are still off-line. Alternatively, the work units can be marked by the resources they need and will be re-inserted in the set of work units to be planned and scheduled when those resources become available. In either case, the work units will be re-considered for planning and scheduling as soon as capabilities to process them will be available.

If sufficient capabilities for producing the work unit are available, timing constraints, such as the amount of time required for each task within a job (e.g., the duration of a transport operation or a processing step), constraints on the intervals during which resources are occupied, and the reservation of resources during such intervals are modified by selection variables and posted to the controller at step 350. Selection variables are Boolean variables, one for each capability, that become either TRUE (the capability is selected) or FALSE (the capability is not selected). Selection variables are created automatically for each capability by the planning step.

Constraints on the selection variables determine that, for example, only one of several alternative capabilities for the same output can be selected (i.e., only its selection variables can be TRUE). The modification of constraints is constraint-type-dependent. Allocation intervals in resource allocations, for example, are multiplied by the selection variables. The effect of these constraint modifications is that some constraints, such as a resource allocation, become only effective if the corresponding capability is being selected. The controller then posts to memory constraints on selection variables and common modules to the constraint store at step 360. At step 370 real-time constraints and order constraints are posted to the controller.

Since the correct output time must be used in the precedence constraints between capabilities of succeeding work units, the output variables of all alternative capabilities are connected to a single time variable, which is then used in the precedence constraints. The job constraints reserve resources for a job and all possible exit ports of capabilities being considered for work units in the job. If only part of a job is being scheduled at this point, the selected resource is reserved for the open-ended future, and otherwise for the duration of the job. This also ensures that jobs will be delivered correctly even if parts of them have not yet been produced due to off-line resources. The sequence of steps presented is only one example embodiment for the method disclosed herein. It will be apparent to one skilled in the art that numerous alternate step sequences would produce a similar result.

Figure 4:
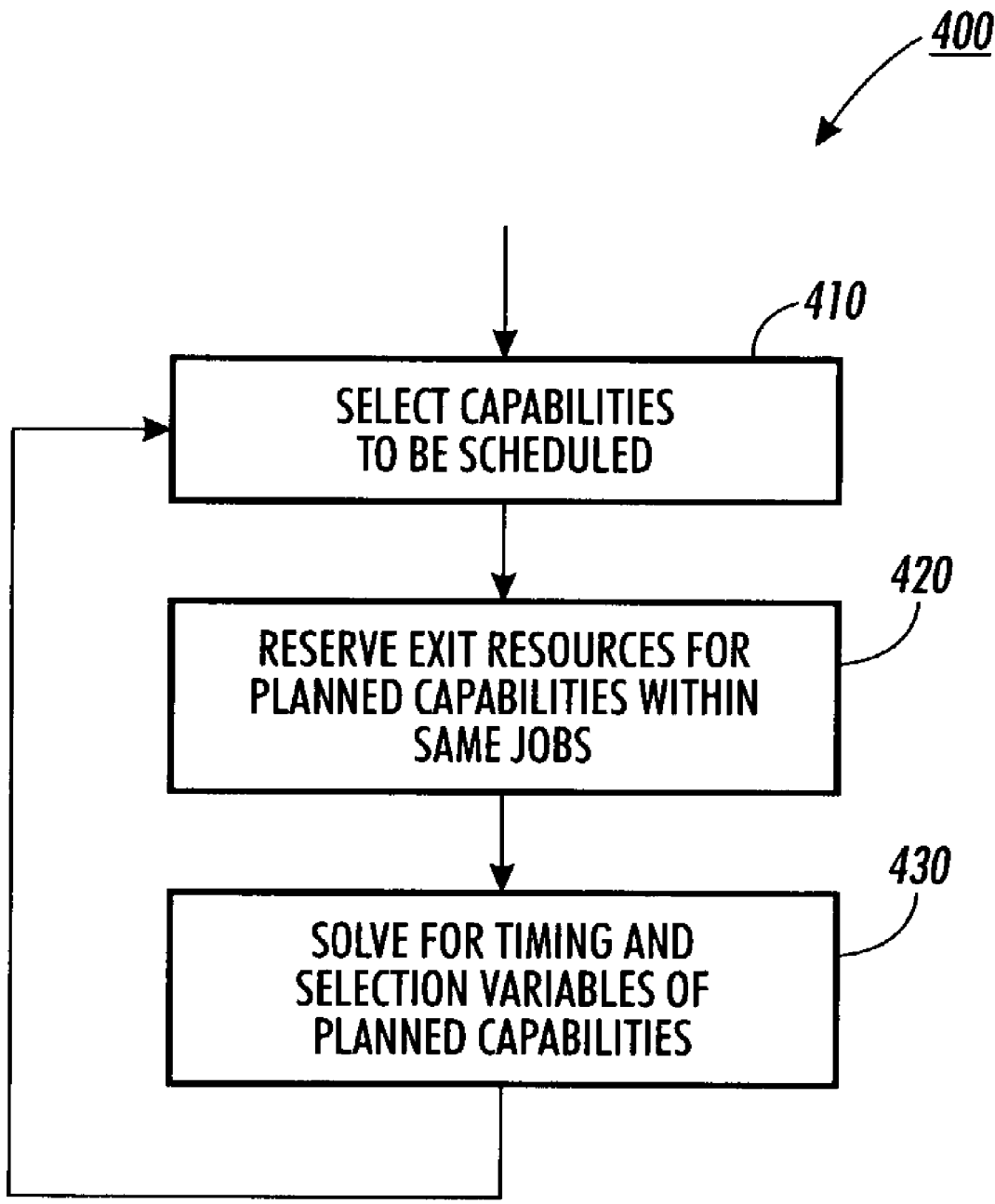
FIG. 4 provides a flow chart detailing the operation of the system scheduling component in accordance with one embodiment of the subject invention.

Turning now to FIG. 4, a flow chart illustrates the scheduling function 400 of the controller. Initially, the controller selects those capabilities to be scheduled, which may be all or a subset of the capabilities provided by the planning step. The controller then reserves exit resources for planned capabilities within the same jobs at step 420. Since all work units of the same job are constrained to be delivered to the same final exit port, the resource connected to that same final exit port, corresponding for example to a finisher stack in a print engine, cannot be used by other jobs until the job is finished. At step 430 the controller then solves for timing and selection variables of planned capabilities. This can be accomplished using a number of constraint solving or constrained optimization techniques, which are known to those skilled in the art.

One possible embodiment of a command set to illustrate the method disclosed herein is as follows:
  initialize schedule S and constraint store C;
    repeat forever do
      determine sequence U of desired work units u at
        allowed exit ports $P_u$
    to be considered for scheduling next;
      for all work units u in U do
        determine set $S_u$ of capabilities s such that u=output
          work unit of s
          and exit port of s is in $P_u$
          and s does not use off-line resources;
      if $S_u$ is empty then
        remove subsequent work units in same job from U;
      else
        add $S_u$ to S;
        post to C: timing constraints of $s_i$ in $S_u$, with selection
          variables $b_i$ added;
        post to C: 1=sum ($s_i$ in $S_u$) $b_i$;
        post to C: real-time constraints for $s_i$ in $S_u$;
      for all $s_i$ in $S_u$, post to C: exit port of $s_i$=exit port of job of
        u; end for

```
post to C: t_o=sum (s_t in S_u) b_t times output time of s_i;
post to C: order constraint for t_o;
end if
end for
    solve for the undetermined time variables and selection
        variables in C;
    send commands to modules based on selected capabili-
        ties (b_t=1) in S and
        determined time variables in C;
    clean up completed parts of S and C;
end repeat
```

However, it must be borne in mind that this sequence provides only one possible command set. One skilled in the art would readily appreciate that individual instructions could be varied in form and that the sequence in which steps are performed could vary, all of which embodiments are contemplated by the disclosure and scope of the claims herein.

This approach of integrated planning and scheduling eliminates the need for a separate, heuristics-based planning algorithm and leads to improved load balancing and productivity over previous approaches. Additionally, the system and method described herein is configuration-independent and thus easily reused for arbitrary reconfigurable production systems that can be modeled in this framework.

While the present invention has been illustrated and described with reference to specific embodiments, further modification and improvements will occur to those skilled in the art. For example, the steps for the planning and scheduling method disclosed herein are not required to be performed in a specified sequence, as will be apparent to one skilled in the art. Indeed, some steps may be executed concurrently with other steps. Also, constraints may be represented numerous different variations. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A computer controlled system for planning and scheduling the work flow for a reconfigurable production system, the computer controlled system comprising:
   a plurality of modules, the reconfigurable production system comprising the plurality of modules, the plurality of modules having a plurality of alternative capabilities, the work flow comprising one or more jobs to be performed on the reconfigurable production system, each job comprising one or more work units to be produced on the reconfigurable production system;
   a system controller;
   a computer-readable memory that stores computer-executable instructions for execution by the system controller, the computer-readable instructions comprising instructions for:
   planning the production of work units of the one or more jobs without utilizing off-line modules, the planning comprising:
       selecting one or more work units to be planned,
       determining one or more system capabilities to produce the one or more work units, such that the off-line modules are not utilized,
       determining whether the system capabilities to produce the one or more work units are available without utilizing the off-line modules, and
       if the system capabilities to produce a work unit are not available without utilizing the off-line modules,
           prior to the work unit reaching the off-line modules, tagging, by the system controller, the work unit with the system capabilities needed for the work unit which are not available,
           prior to the work unit reaching the off-line modules, removing, by the system controller, the work unit and all subsequent work units of the same job from consideration, and
           reinserting, by the system controller, the work unit and all subsequent work units when the system capabilities needed by the work unit become available, and
   scheduling the production of the one or more work units without utilizing the off-line modules, wherein
   the off-line modules are modules of the reconfigurable production system that are temporarily unavailable to produce work units,
   the reconfigurable production system continues to produce work units while the work unit is removed from consideration, and
   the work units of each job are produced in order, wherein
   the system capabilities are operations that accept the work unit at an entry port, process the work unit, and move the work unit to an exit port.

2. The system according to claim 1, wherein said planning further comprises:
   modifying one or more of timing constraints, interval constraints, and precedence constraints using selection variables so that the work units can be produced;
   posting one or more selection variable constraints on selection variables and the plurality of modules to memory so that the work units can be produced;
   posting the timing, interval, and precedence constraints to memory so that the work units can be produced; and
   reserving a selected resource if only part of a job is being scheduled.

3. The system according to claim 2, wherein selecting one or more work units to be planned is based on an input job description.

4. The system according to claim 2, wherein the determining of the system capabilities to produce said one or more work units further comprises specifying a desired exit port and itinerary.

5. The system according to claim 4, further comprising instructions for selecting at least one alternative one of the system capabilities from the reconfigurable production system modules.

6. The system according to claim 2, wherein said selection variables are created automatically for each system capability.

7. The system according to claim 2, wherein said selection variables comprise Boolean variables.

8. The system according to claim 2, wherein said constraints modified by said modifying instruction comprise the reservation of one or more resources during intervals in which reconfigurable production system modules are occupied.

9. The system according to claim 2, wherein posting the timing, interval, and precedence constraints comprises connecting variables of all alternative capabilities between successive ones of the work units to a single time variable.

10. The system according to claim 1, wherein said scheduling comprises:
   selecting one or more capabilities to be scheduled;
   reserving one or more exit resources of the plurality of modules for the selected capabilities, each exit resource being a resource that relates to the exit of work units from the corresponding one of the modules; and
   solving for one or more of timing and selection variables.

11. The system according to claim 2, further comprising instructions for acquiring at least one capability model from at least one of the plurality of modules.

12. The system according to claim 1, wherein said plurality of modules comprises a print engine module.

13. The system according to claim 1, wherein said plurality of modules comprise an analysis module.

14. The system according to claim 1, wherein said plurality of modules comprise a manufacturing line module.

15. The system according to claim 1, wherein said plurality of modules comprise a packaging line module.

16. A method for planning and scheduling the work flow for a computer controlled reconfigurable production system having a plurality of modules with a plurality of alternative capabilities, the work flow comprising one or more jobs for production on the reconfigurable production system, each job comprising one or more work units to be produced on the reconfigurable production system, the method comprising:
   planning the work flow for the reconfigurable production system, without utilizing off-line modules, the planning the work flow comprising:
      acquiring a description of one or more work units of the one or more jobs to be produced,
      selecting at least one of the work units to be planned,
      determining the capabilities needed to produce the at least one of the work units without utilizing the off-line modules,
      determining whether the capabilities needed to produce the at least one of the work units without utilizing the off-line modules are available, and
      if the capabilities to produce a work unit are not available without utilizing the off-line modules;
         prior to the work unit reaching the off-line modules, tagging, by the reconfigurable production system, the work unit with the capabilities needed for the work unit which are not available,
         prior to the work unit reaching the off-line modules, removing, by the reconfigurable production system, the work unit and all subsequent work units of the same job from consideration; and
         reinserting, by the reconfigurable production system, the work unit and all subsequent work units when the capabilities needed by the work unit become available, and
   scheduling the work flow for the plurality of modules in the reconfigurable production system, without utilizing the off-line modules, wherein
   the off-line modules are modules of the reconfigurable production system that are temporarily unavailable to produce work units,
   the reconfigurable production system continues to produce work units while the work unit is removed from consideration, and
   the work units of each job are produced in order, wherein the system capabilities are operations that accept the work unit at an entry port, process the work unit, and move the work unit to an exit port.

17. A method according to claim 16, wherein planning aid work flow further comprises:
   modifying one or more of timing, interval, and precedence constraints using election variables;
   posting one or more selection variable constraints on selection variables and common modules to a memory; and
   posting the timing, interval, and precedence constraints to the memory.

18. A method according to claim 17, wherein determining the capabilities needed to produce at least one of the work units comprises selecting alternative capabilities from the capabilities of the reconfigurable production system modules.

19. A method according to claim 17, wherein said modified constraints comprise the reservation of resources during the intervals in which reconfigurable production system modules are occupied.

20. A method according to claim 17, wherein said selection variables are created automatically for each capability.

21. A method according to claim 17, wherein said selection variables comprise Boolean variables.

22. A method according to claim 17, wherein said precedence constraints comprise connecting the output variables of all alternative capabilities between successive ones of the work units to a single time variable.

23. A method according to claim 17, further comprising reserving a selected resource if only part of a job is being scheduled.

24. A method according to claim 16, wherein scheduling the work flow for the plurality of modules in the reconfigurable production system comprises:
   selecting one or more capabilities to be scheduled;
   reserving one or more exit resources for the selected capabilities within the same jobs; and
   solving for one or more timing and selection variables of the selected capabilities.

25. A method according to claim 24, wherein said selected capabilities include a subset of capabilities needed to produce the at least one of the work units.

26. A method according to claim 24, wherein said selected capabilities include all of the capabilities needed to produce the at least one of the work units.

27. A method according to claim 17, wherein said capabilities comprise capability models for at least one of the plurality of modules.

28. A method according to claim 17, wherein said capabilities comprise feature constraints.

29. A method according to claim 17, wherein said capabilities comprise timing constraints.

30. An article of manufacture comprising a computer-readable recording medium having computer readable program code embodied in the medium which, when the program code is executed by a computer causes the computer to perform a method for planning and scheduling for a computer controlled reconfigurable production system, the method comprising:
   planning the work flow for the reconfigurable production system without utilizing off-line modules, the work flow comprising one or more jobs for production on the reconfigurable production system, each job comprising one or more work units to be produced on the reconfigurable production system, wherein the planning the work flow comprises:
      acquiring a description of one or more work units of the one or more jobs to be produced,
      selecting at least one of the work units to be planned, determining the capabilities needed to produce the at least one of the work units without utilizing the off-line modules, determining whether the capabilities needed to produce the at least one of the work units without utilizing the off-line modules are available, if a work unit cannot be produced without utilizing the off-line modules, prior to the work unit reaching the off-line modules, tagging, by the reconfigurable production system, the work unit with the capabilities needed for the work unit which are not available, prior to the work unit reaching the off-line modules, removing, by the reconfigurable production system, the work unit and all subsequent work units of the same job from further consideration, and reinserting, by the reconfigurable production system, the work unit and all subsequent work units when the capabilities needed by the work unit become available, modifying one or more of timing, interval, and precedence constraints using selection variables, posting one or more selection variable constraints on selection variables and common modules to a memory, posting the timing, interval, and precedence constraints to the memory; and scheduling the work flow for the plurality of modules in the reconfigurable production system without utilizing the off-line modules, wherein the off-line modules are modules of the reconfigurable production system that are temporarily unavailable to produce work units, the reconfigurable production system continues to produce work units while the work unit is removed from consideration, and the work units of each job are produced in order, wherein the system capabilities are operations that accept the work unit at an entry port, process the work unit, and move the work unit to an exit port.

31. An article of manufacture comprising a computer-readable recording medium having computer readable program code embodied in said medium which, when said program code is executed by said computer causes said computer to perform a method for planning and scheduling computer controlled reconfigurable production systems according to claim 30, wherein scheduling said work flow comprises:

selecting one or more capabilities to be scheduled;

reserving one or more exit resources for the selected capabilities within the same jobs; and solving for one or more timing and selection variables of the selected capabilities.

\* \* \* \* \*